United States Patent [19]

Doi et al.

[11] 3,859,546

[45] Jan. 7, 1975

[54] RECTANGULAR PIEZOELECTRIC CERAMIC RESONATOR OPPOSITELY POLED ALONG OPPOSITE SIDE SURFACES

[75] Inventors: Kikuo Doi; Takehiro Futami, both of Tokyo, Japan

[73] Assignee: Nippon Electric Company Limited, Tokyo, Japan

[22] Filed: Sept. 17, 1973

[21] Appl. No.: 397,751

[30] Foreign Application Priority Data

Sept. 19, 1972 Japan ............................... 47-94368

[52] U.S. Cl. ....................... 310/9.5, 310/8.2, 333/72

[51] Int. Cl. ............................................... H01v 7/00

[58] Field of Search .......... 310/8.2, 9.5, 9.6; 333/72

[56] References Cited

UNITED STATES PATENTS

| | | | |
|---|---|---|---|
| 2,838,696 | 6/1958 | Thurston | 310/9.5 X |
| 2,880,334 | 3/1959 | Mason | 310/9.6 |
| 2,906,971 | 9/1959 | Mason et al. | 333/72 X |
| 2,978,596 | 4/1961 | Harris | 310/8.2 |
| 3,293,575 | 12/1966 | Albsmeier | 333/72 |
| 3,774,057 | 4/1972 | Tsubouchi | 310/9.5 |

*Primary Examiner*—Mark O. Budd

*Attorney, Agent, or Firm*—Sandoe, Hopgood & Calimafde

[57] ABSTRACT

A torsional mode electromechanical transducer comprises a piezoelectric ceramic piece oppositely poled along opposite side surfaces and a pair of electrodes attached to the respective principal surfaces of the ceramic piece. A mechanical resonator having appropriate planar surfaces may be attached to one or both of the electrodes with the ceramic piece. A pair of such piezoelectric ceramic pieces may be fixed together with a common electrode interposed and with the directions of residual polarization of the respective ceramic pieces disposed antiparallel.

6 Claims, 7 Drawing Figures

RECTANGULAR PIEZOELECTRIC CERAMIC RESONATOR OPPOSITELY POLED ALONG OPPOSITE SIDE SURFACES

BACKGROUND OF THE INVENTION

This invention relates to a torsional mode electromechanical transducer comprising at least one piezoelectric or ferroelectric ceramic piece, such as may be used in a mechanical filter.

A filter plays an important role in multiplexed communication via connecting or distributing transmission channels. As the channels become highly multiplexed, high selectivity and high stability are urgently required of a filter. In this connection, a mechanical filter is preferred because its Q-value and stability are higher by several orders than those of a filter using conventional electric circuit elements (coils and capacitors). This is due to the mechanical vibrator or resonator of the mechanical filter made of an elastically invariable material. A mechanical filter is further advantageous because of its compactness, rigidity, and good characteristics.

In the case of a mechanical resonator, the relation between the resonance frequency and the dimensions is uniquely determined by the mode of vibration. For example, the resonance frequency is determined by the length of the mechanical resonator for a longitudinal or a torsional mode of vibration and by the length and the thickness for a bending mode of vibration. When comparing the longitudinal mode of vibration and the torsional mode, which are frequently used in a mechanical resonator, the propagation speed of the longitudinal mode of vibration is much higher than that of the torsional mode of vibration. With a higher speed of propagation, a mechanical resonator of given dimensions provides a higher resonance frequency. The torsional mode of vibration is therefore advantageous in miniaturizing a mechanical resonator and, in addition, insures a high Q-value and high stability.

Proposals have been made of a torsional mode electromechanical transducer comprising a piezoelectric ceramic piece. Such an electromechanical transducer, however, is complicated in structure and is difficult to manufacture on an industrial scale because of the problems which must be overcome to shape, finish, and pole the piezoelectric ceramic piece and to attach the ceramic piece to a mechanical resonator.

An electromechanical transducer comprising a generally disc-shaped piezoelectric ceramic piece is disclosed in a prior U.S. patent application Ser. No. 26,231 filed Apr. 17, 1972, now U.S. Pat. No. 3,744,057 by Norio Tsubouchi and in a corresponding German patent application published in "Offenlegungsschrift" No. 2,219,735 on Jan. 25, 1973. It is relatively easy to manufacture the piezoelectric ceramic piece used in the transducer of those prior applications. The transducer has an excellent capacitance ratio. If the excellent capacitance ratio was sacrificed, it was found that a mechanical quality factor as high as 3,000 and a stability as high as ±40 Hz could be attained with a modified transducer that was developed later. These last mentioned characteristics are particularly important for a mechanical signal filter used in channel translating equipment for higher carrier frequencies.

SUMMARY OF THE INVENTION

It is therefore an object of the present invention to provide a torsional mode electromechanical transducer comprising an easily shaped piezoelectric ceramic piece.

It is another object of this invention to provide a torsional mode electromechanical transducer comprising an easily poled piezoelectric ceramic piece.

It is still another object of this invention to provide a torsional mode electromechanical transducer comprising a piezoelectric ceramic piece that can be readily attached to a mechanical resonator.

It is a further object of this invention to provide a torsional mode electromechanical transducer of the type described, that has a high mechanical quality factor, a low impedance, and an acceptable capacitance ratio.

It is a still further object of this invention to provide a torsional mode electromechanical transducer of the type described, excellently suited for use in a signal filter for channel translating equipment.

In general, an electromechanical transducer comprises a piezoelectric ceramic piece poled in a specific manner and a pair of electrodes attached to the opposing surfaces of the ceramic piece, respectively. In accordance with one aspect of this invention, the piezoelectric ceramic piece is rectangular in outline and oppositely poled along the opposite side surfaces of the ceramic piece toward both ends of a diagonal of the ceramic piece. The electrodes are attached to the respective principal surfaces of the ceramic piece. A mechanical resonator having a planar surface may be used as one or both of the electrodes with the ceramic piece attached to the planar surface.

In accordance with another aspect of this invention, a pair of rectangular piezoelectric ceramic pieces poled in the above-defined manner are fixed together with a common electrode interposed and with the directions of residual polarization of the respective ceramic pieces disposed antiparallel. A mechanical resonator having a pair of parallel planar surfaces may be used as the common electrode with the ceramic pieces attached to the respective planar surfaces in the manner specified.

In accordance with a third aspect of this invention, an electromechanical transducer comprises a mechanical resonator having a pair of parallel planar surfaces, a pair of rectangular piezoelectric ceramic pieces poled as above and attached to the respective planar surfaces with the directions of residual polarization of the respective ceramic pieces disposed parallel, and a pair of electrodes attached to the exposed surfaces of the ceramic pieces, respectively.

For a more detailed understanding of the invention, reference may be made to the description of the preferred embodiments below, taken in conjunction with the accompanying drawings wherein:

DESCRIPTION OF THE PREFERRED EMBODIMENTS

Figure 1:
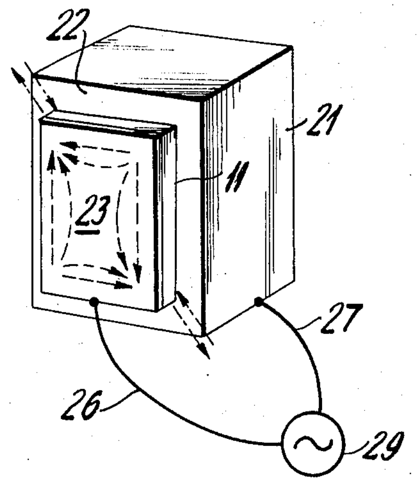
FIG. 1 is a schematic perspective view of an electromechanical transducer according to a first embodiment of the instant invention.

Referring to FIG. 1, an electromechanical transducer according to a first embodiment of the present invention comprises a piezoelectric ceramic piece 11 that is rectangular in outline and oppositely poled substantially along the opposite side surfaces so that the residual polarization may be directed to both ends of a diagonal of the ceramic piece 11 as shown with dashed lines. The piezoelectric material may, for example, be barium titanate ($BaTiO_3$) or a solid solution of lead titanate ($PbTiO_3$) and lead zirconate ($PbZrO_3$).

Figure 2:
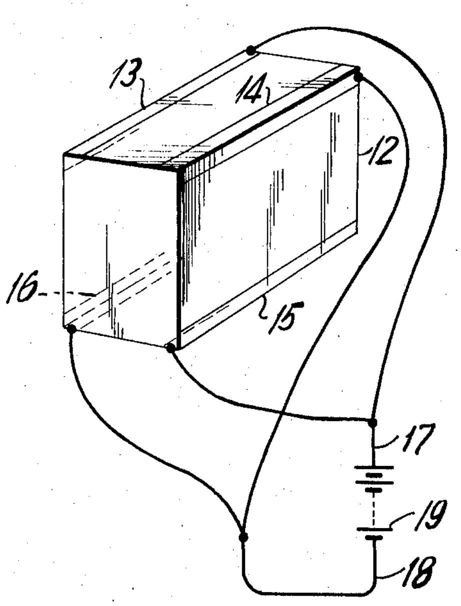
FIG. 2 is a schematic perspective view of a piezoelectric ceramic block being poled.

Referring to FIG. 2, a block of the piezoelectric material is provided with electrodes 13, 14, 15, and 16 along the respective side edges of the block 12. The electrodes 13 and 15 attached to a pair of diagonally opposite edges are connected by a wire 17. Likewise, the remaining electrodes 14 and 16 are connected by another wire 18. Through the wires 17 and 18, strong d.c. electric fields are produced within the block 12 by a d.c. power source 19 symbolized by a battery. After poling, the block 12 is sliced into a plurality of piezoelectric ceramic pieces, such as the ceramic piece 11.

Referring back to FIG. 1, the electromechanical transducer comprises a mechanical vibrator or resonator 21 made of an elastically invariable material and having at least one planar surface 22. The ceramic piece 11 is fixed to the planar surface 22 with an electroconductive binding agent. The exposed surface of the ceramic piece 11 is covered with an electrode 23. Leads 26 and 27 are attached to the electrode 23 and the mechanical resonator 21, through which an a.c. voltage is applied by a driving power source 29 for driving the electromechanical transducer. It will now be appreciated that the mechanical resonator 21 serves as one of a pair of electrodes attached to the respective principal surfaces of the ceramic piece 11.

Figure 3:
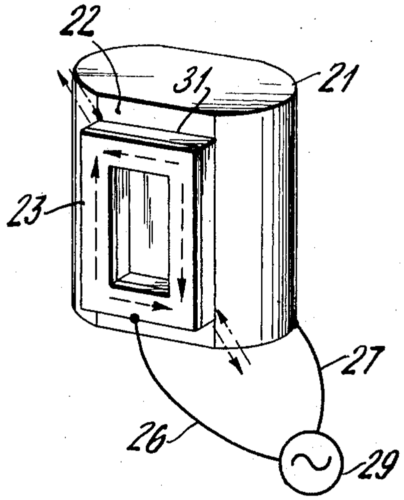
FIG. 3 is a schematic perspective view of an electromechanical transducer according to a second embodiment of this invention.

Referring to FIG. 3, an electromechanical transducer according to a second embodiment of this invention comprises similar components designated with like reference numerals as in the first embodiment except for a piezoelectric ceramic piece 31 that is also rectangular in outline but has a rectangular window through the central area. The ceramic piece 31 may be made by forming the window by, for example, ultrasonic machining through a ceramic piece obtained in the manner described with reference to FIG. 2. It will be noticed that the mechanical resonator 21 here is generally cylindrically shaped but has at least one planar surface 22.

Referring to FIGS. 1 and 3, it will be understood that the driving a.c. voltage is applied perpendicular to the piezoelectric ceramic piece 11 or 31 and accordingly to the directions of the residual polarization. As is already known in the art, the production of sliding stress within an electrostrictive transducer results from an a.c. voltage applied in a direction perpendicular to the residual polarization. The ceramic piece 11 or 31 is therefore subjected to sliding stress exemplified by dash-dot lines. The sliding stress results in the torsional mode of vibration in the ceramic piece 11 or 31 and consequently in the mechanical resonator 21.

Figure 4:
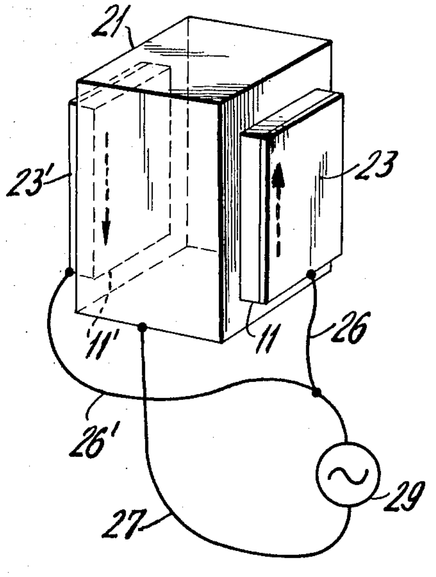
FIG. 4 is a similar view of an electromechanical transducer according to a third embodiment of this invention.

Referring to FIG. 4, an electromechanical transducer according to a third embodiment of this invention comprises a first and a second piezoelectric ceramic piece 11 and 11′ similar to the ceramic piece 11 described in conjunction with the first embodiment and a mechanical resonator 21 having at least two parallel planar surfaces 22 and 22′. The ceramic pieces 11 and 11′ are fixed to the respective planar surfaces 22 and 22′ by an electroconductive bining agent with the directions of the residual polarization of the respective ceramic pieces 11 and 11′ disposed substantially antiparallel. The exposed principal surfaces of the first and second ceramic pieces 11 and 11′ are covered with a first and a second electrode 23 and 23′, respectively. Besides leads 26 and 27 connected to the first electrode 23 and the mechanical resonator 21, a third lead 26′ is connected to the second electrode 23′. It will now be understood that the mechanical resonator 21 also serves as a common electrode for the ceramic pieces 11 and 11′ and that a conventional electrode attached to the ceramic pieces 11 and 11′ may be substituted for the mechanical resonator 21. A driving a.c. power source 29 is connected between the common lead 27 and the lead 26 and between the common lead 27 and the third lead 26′.

Figure 5:
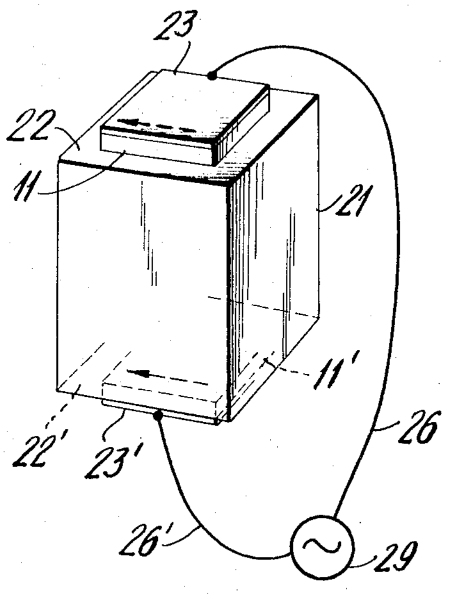
FIG. 5 is a similar view of an electromechanical transducer according to a fourth embodiment of this invention.

Referring to FIG. 5, an electromechanical transducer according to a fourth embodiment of this invention is similar to one according to the third embodiment except that the ceramic pieces 11 and 11′ are fixed to a pair of parallel planar surfaces 22 and 22′ of a mechanical resonator 21 with the directions of the residual polarization disposed substantially parallel. The driving a.c. voltage is applied only between the electrodes 23 and 23′ attached to the outer principal surfaces of the respective ceramic pieces 11 and 11′. Here, the ceramic pieces 11 and 11′ are substantially square in outline and the longitudinal end surfaces 22 and 22′ of the mechanical resonator 21 provide two parallel planar surfaces.

Figure 6:
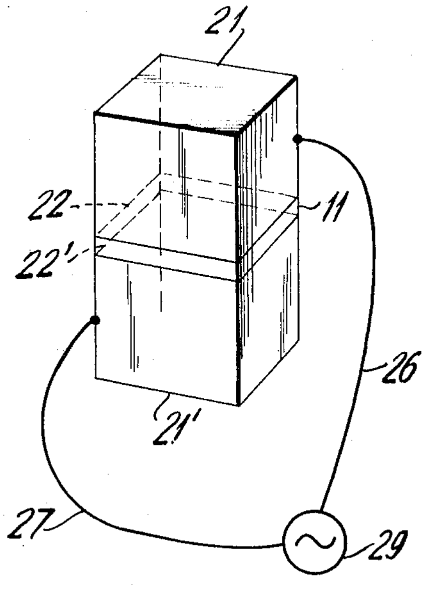
FIG. 6 is a like view of an electromechanical transducer according to a fifth embodiment of this invention.

Referring to FIG. 6, an electromechanical transducer according to a fifth embodiment of this invention comprises a pair of mechanical resonators 21 and 21′, each having at least one planar surface, such as 22 and 22′. The planar surfaces 22 and 22′ of the respective mechanical resonators 21 and 21′ are fixed to the principal surfaces of the piezoelectric ceramic piece 11.

Figure 7:
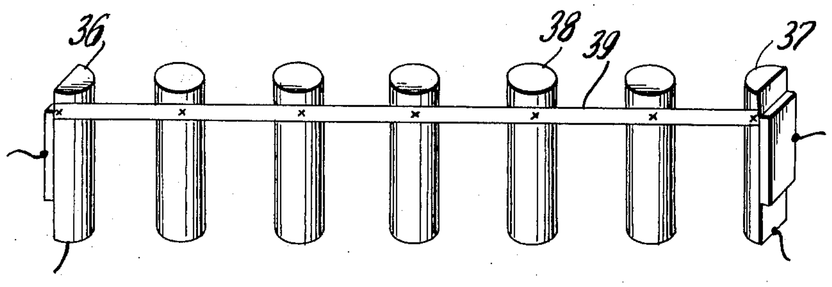
FIG. 7 is a schematic perspective view of a mechanical filter comprising a pair of electromechanical transducers according to this invention.

Referring finally to FIG. 7, a mechanical filter comprises a pair of electromechanical transducers 36 and 37 according to this invention and a plurality of mechanical resonators generally designated at 38. The transducers 36 and 37 and the resonators 38 are welded to a coupling rod 39.

Several lead zirconate-titanate ceramic pieces were provided, some being 15 millimeters long, 5 millimeters wide, and 1 millimeter thick and others being 6 millimeter both in length and width and 1 millimeter in thickness. For the radial mode of vibration, the electromechanical coupling coefficient $K_r$ was 65 percent and the mechanical quality factor $Q_m$ was 1,000. The ceramic pieces were poled with a d.c. electric field between 2 and 3 kV/mm produced along the length of each ceramic piece at 100°C for 30 minutes. Some of the ceramic pieces were provided with windows 11 millimeters long and 1 millimeter wide for the rectangular pieces and 2 millimeters square for the square pieces. 6 millimeter square rectangular parallelopiped mechanical vibrators having lengths of 18 millimeters and 9 millimeters were made of an iron-nickel-chromium alloy known as "elinvar." In addition, mechanical resonators of the shape shown in FIG. 3 were made of "elinvar" rods, 6 millimeters in diameter and 18 millimeters in length, by cutting off 1.5 millimeters in sagitta to form the parallel planar surfaces. The piezoelectric ceramic pieces were attached to the mechanical resonators in various combination with an electrocunductive binding agent including silver paste as the principal constituent. Use was made of evaporated gold electrodes. The following table shows the typical results obtained with the torsional mode electromechanical transducers so formed.

| electromechanical transducer | resonance frequency (kHz) | capacitance ratio | mechanical quality factor $Q_m$ | capacity at 1 kHz (pF) |
|---|---|---|---|---|
| FIG. 1 | 54.9 | 150 | 1450 | 750 |
| FIG. 1, with piece shown in FIG. 3 | 53.5 | 120 | 1420 | 640 |
| FIG. 3 | 52.0 | 100 | 1400 | 620 |
| FIG. 3, with piece shown in FIG. 1 | 53.8 | 130 | 1450 | 720 |
| FIG. 4 | 54.7 | 75 | 1350 | 1500 |
| FIG. 4, with resonator shown in FIG. 3 | 53.5 | 70 | 1350 | 1400 |
| FIG. 4, with pieces shown in FIG. 3 | 53.7 | 50 | 1320 | 1300 |
| FIG. 4, with pieces and resonator shown in FIG. 3 | 53.0 | 45 | 1300 | 1250 |
| FIG. 4, with an intermediate electrode substituted for resonator | 56.3 | 20 | 850 | 1450 |
| FIG. 5, with only one piece | 51.0 | 150 | 1400 | 360 |
| FIG. 5, with residual polarization directed antiparallel | 50.5 | 70 | 1350 | 730 |

It can readily be seen from the table that the resonance frequency is low as compared with the bulk of the electromechanical transducer, that the transducer has high mechanical quality factor and large electrostatic capacity, and that the capacitance ratio is sufficiently small. The decrease in the capacitance ratio is remarkable when the structure shown in FIG. 4 is resorted to and, in particular, when an intermediate electrode is substituted for the mechanical resonator 21. The electrostatic capacity is adjustable with choice of the thickness of the piezoelectric ceramic piece 11 or 31. In addition, it is easy to produce electromechanical transducers of small sizes, such as those having a mechanical resonator of 1.5 millimeters in diameter, by forming a planar surface longitudinally of the resonator and by attaching a piezoelectric ceramic piece to the planar surface.

Numerous variations and modifications of the above described embodiments that are within the scope of the invention will occur to those skilled in the art, as the above embodiments are merely exemplary and not intended to limit the invention or illustrate all possible variations thereof.

What is claimed is:

1. A torsional mode electromechanical transducer comprising:

a piezoelectric ceramic piece that is rectangular in outline and has a pair of opposing principal surfaces, and first and second sets of side surfaces extending between said principal surfaces;

an electrode attached to each principle surface respectively; and said ceramic piece being poled in opposite directions along two paths formed by the first and second sets of the side surfaces toward both ends of a diagonal of the principal surface.

2. An electromechanical transducer as set forth in claim 1, wherein at least one of said electrodes is a mechanical resonator having at least one planar surface attached to said ceramic piece.

3. An electromechanical transducer as set forth in claim 1, wherein each of said electrodes is a mechanical resonator having a planar surface attached to said ceramic piece.

4. An electromechanical transducer as set forth in claim 1, further comprising a second piezoelectric ceramic piece that is rectangular in outline and has a pair of opposing principal surfaces and first and second sets of side surfaces extending between the principal surfaces thereof, said second ceramic piece being poled in opposite directions along two paths formed by the first and second sets of side surfaces toward the ends of a diagonal of its principal surfaces with the directions of residual polarization of the respective ceramic pieces disposed antiparallel, one of the principal surfaces of said second ceramic piece being attached to one of said electrodes, said transducer further comprising an additional electrode attached to the remaining principal surface of said second ceramic piece.

5. An electromechanical transducer as set forth in claim 4, wherein a mechanical resonator having at least two parallel planar surfaces forms the electrode interposed between the two ceramic pieces with said ceramic pieces each attached to the one of the planar surfaces.

6. An electromechanical transducer as set forth in claim 1, further comprising a second piezoelectric ceramic piece that is rectangular in outline and has a pair of opposing principal surfaces and first and second sets of side surfaces extending between the principal surfaces of each pair, said second ceramic piece being toward the ends of a diagonal of its principal surfaces, one of said electrodes being a mechanical resonator having at least two parallel planar surfaces, the two ceramic pieces being attached to said planar surfaces respectively, with the directions of residual polarization of the respective ceramic pieces disposed parallel, said transducer further comprising an additional electrode attached to the remaining principal surface of said second ceramic piece.

* * * * *